Patented Feb. 25, 1941

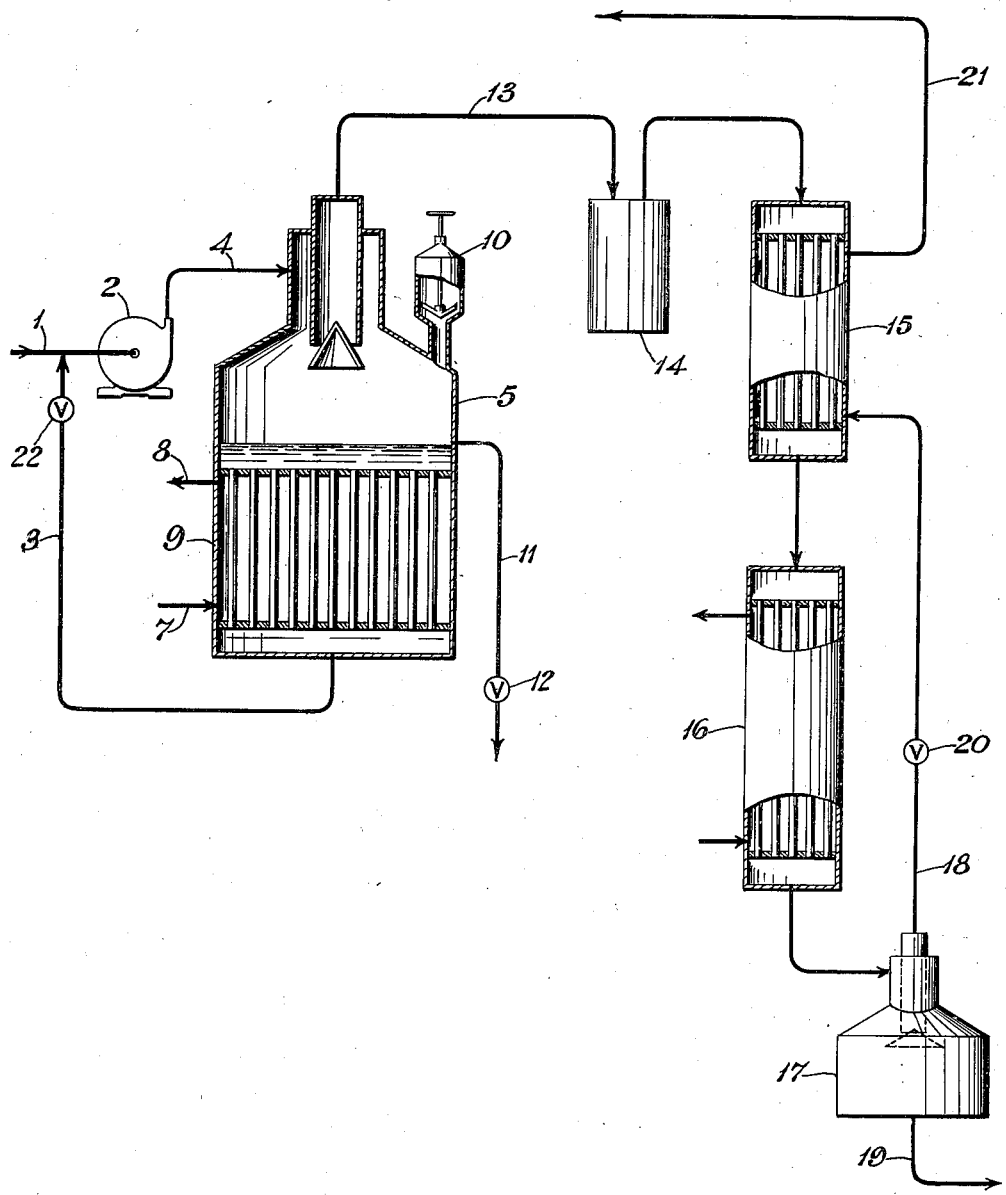

2,232,839

UNITED STATES PATENT OFFICE 2,232,839

COMPRESSION PROCESS

Albert Smith Carter, Wilmington, Del., assignor to E. I. du Pont de Nemours & Company, Wilmington, Del., a corporation of Delaware Application December 17, 1938, Serial No. 246,347

2 Claims. (Cl. 260—678)

This invention relates to the preparation of vinylacetylene. More particularly it relates to processes of compression of mixtures of acetylenic gases containing vinylacetylene. Still more particularly it relates to processes combining compression, cooling, partial drying and partial condensation of mixtures comprising acetylene and acetylene polymers, particularly vinyl acetylene.

Methods of compressing acetylene in particular and gases in general are old and well known. Compression of acetylene and nonbenzenoid acetylene polymers is hazardous, but methods have been developed which have proved satisfactory. In general, reciprocating compressors are more hazardous than rotary or centrifugal compressors owing to the possibility of excessively high pressures upon valve failure and the danger of high temperatures produced adiabatically if piston velocities are not held within narrow limits.

Various processes for the manufacture from acetylene of non-benzenoid polymers, particularly vinylacetylene ($C_4H_4$), divinylacetylene ($C_6H_6$), and octatrieneyne ($C_8H_8$), are already known to the art. Among these an outstanding process is that described by Carter and Downing in U. S. Patent 2,048,838, in which process acetylene is circulated over a suitable cuprous chloride catalyst and a portion is converted to the non-benzenoid acetylene polymers. In the process of this patent, the effluent gas from the catalyst contains acetylene, acetylene polymers, acetaldehyde, water vapor, traces of hydrochloric acid, and a very small amount of other by-products of the acetylene polymerization, primarily chloroderivatives such as 2-chloro-1:3-butadiene. Carter and Downing have disclosed the temperature ranges necessary to condense the acetylene polymers from the acetylene stream; they have further stated that the ease of condensation may be improved by increasing the pressure on the gas mixture; further, they have disclosed the necessity of drying the acetylenic mixture before condensation in order to avoid excessive deposition of ice in the low temperature zone. They have pointed out the fact that partial drying may be accomplished by contacting the gas with a strong, cold brine solution in suitable towers or other apparatus. Final drying may be accomplished according to Chilton, U. S. Patent 1,999,397.

In carrying out the previous process, if it is desirable to compress prior to low temperature condensation, it is found that moisture and hydrocarbons separate in the compressor if the temperature is held down to the temperature of the gas leaving the primary coolers thru which it passes prior to entering the compressor. For safety and economy, it is desirable to hold the temperature constant in the compressor at about 0° C., and therefore, it is desirable to find a compression arrangement which will permit this and provide for the condensation which may occur.

It is, therefore, an object of this invention to provide a safe method for compressing acetylenic gases, particularly those comprising both acetylene and vinylacetylene. A further object is to provide a safe method for compressing acetylenic gases, particularly those comprising both acetylene and vinylacetylene, in which the gases are cooled during compression so as to prevent any substantial temperature rise during compression. A still further object is to provide a method for compressing gases comprising both acetylene and vinylacetylene, in which the gases are simultaneously compressed and cooled and in which means are provided for continuously disposing of condensates particularly moisture, which may be formed as a result of such compression and/or cooling. Still another object is to provide such a method of compressing, cooling, and disposing of condensates in which the gases are circulated thru subsequent operations by the compressor. Other objects will appear hereinafter.

It has now been found that these objects may be accomplished by compressing acetylenic gases in a liquid sealed rotary pump. It has further been found that the invention is particularly applicable to the compression of acetylenic gases comprising both acetylene and vinylacetylene and obtained as reaction gases from a polymerization process in which acetylene is polymerized to non-benzenoid polymers. By circulating the sealing liquid in a system in which it is introduced into contact with the reaction gases before they are compressed, separated under pressure together with any condensates from the compressed and uncondensed gases, separated from condensed hydrocarbons, and cooled, and thereafter returned again into the stream of reaction gases before the said reaction gases are compressed, the desired cooling during compression is obtained, along with disposition of condensates and circulation of the compressed gases. Since the compressor as described above serves to circulate the compressed gases thru subsequent operations, it is possible, for example, when using it in connection with the process described in the Carter and Downing Patent 2,048,838, to do away with the circulating pump, (indicated as No. 3 on the inlet side of the catalyst tube in the drawing which is a part of the Carter and Downing patent).

In order that this invention may be better understood reference is made to the accompanying diagram of suitable equipment for carrying out the method which forms the subject matter of the present invention. It will be understood that the arrangement and equipment shown are specifically described for the purpose of illustration only and thus are not intended to be construed as limiting the scope of the invention.

In the drawing which illustrates equipment arranged to compress gases formed according to the process outlined in the above identified Carter and Downing patent, the gas from the catalyst tube (not shown) enters the compression zone thru line 1. This gas may come directly from the catalyst tube and be hot, or it may come through an intermediate cooling and/or condensation step and in such case, it is probably at about the temperature which will be desired in the compressor, for example 0° C. The gas enters pump 2 together with brine or other low freezing point solution which serves as a sealing liquid and which is introduced through line 3. The rate of flow of the sealing liquid thru line 3 and into the pump is controlled by valve 22. It is necessary to control this rate of flow but the control device need not be a valve. Any mechanical device which will restrict the flow to a substantially constant rate, such, for example, as an orifice plate may be substituted for valve 22. A rotary pump particularly suited for use as the compressor is the socalled Nash type pump. The discharge at higher pressure (e. g. 35 lbs. per sq. in. absolute) leaves the pump through line 4, enters a separator 5 in which the gas and salt solution are separated and discharges thence to the condensing system. The separator 5 may be of any conventional design, but is preferably of the centrifugal type, such as is diagrammatically illustrated in the figure.

Compression and cooling in pump 2 generally results in condensation of water and/or acetylene polymers; this, of course, is dependent upon the partial pressures of the constituents in the compressed gases, but in the preferred manner of operation of the acetylene polymerization process, the gas entering the pump will be at or near its dew point. Water condensing in the pump will dissolve in the brine solution and result in its dilution; acetylene polymers condensed will separate as a partially emulsified oil. In order to separate the condensed acetylene polymers, a brine storage or settling tank should be provided, in which the hydrocarbon oil may separate and be drawn off. This vessel should be cooled to the temperature of pump 2 and it has been found convenient to make it an integral part of the separator 5 as shown in the diagram, though it is also satisfactory to have it arranged as a separate unit. The acetylene polymers which are of lower density than the brine, separate and form a layer which may be drawn off continuously or intermittently through line 11 and valve 12. The composition of this layer will vary with the manner of operation of the acetylene polymerization cycle, but it will essentially consist of divinylacetylene containing small amounts of vinylacetylene and octatrieneyne, saturated with acetylene at the temperature and pressure of the high pressure side of the pump.

The brine solution in the pump cycle must be cooled for two purposes *a* to remove the heat of compression, and *b* to assist in condensing water.

The amount of cooling necessary will be dependent upon the temperature of the gas entering at 1 and the desired temperature leaving at 4. The cooling may be provided in any of several well known methods; the lines leaving 5 before entering 2 may be jacketed with a suitable low temperature brine, or the liquid may be circulated through a suitable heat exchanger of the tubular type, but a preferred method of cooling is to arrange the heat exchanger as an integral part of the separator 5. Thus in the diagram, a portion of the separator is constructed as a calandria 9 through which the cooling medium is entered at 7 and discharged at 8. The condensation of moisture in this pump cycle will result in an increase in the volume of the circulating brine or salt solution, therefore, excess brine as well as condensed hydrocarbon material will be withdrawn through line 11. For reasons discussed in the previous patent, it is desirable to maintain a balance on the water in the acetylene polymerization system, therefore, it is desirable to weigh or measure the aqueous layer separated at 11 from which the water condensed may be calculated. If the brine volume of the system is made up to the over-flow line 11 originally and drained to this level at all times thereafter, the water content may be maintained constant. Further, owing to this dilution, it is necessary to add solid salt to renew the strength of the circulating brine. The weight of salt necessary to compensate for the dilution as calculated from the water removed at 11, is introduced periodically through hopper 10, so arranged that the solid salt may be introduced, the hopper swept with a small volume of gas, and the contents finally discharged into the brine storage by equalizing the pressure of the hopper and the system.

The capacities of the pump, the separator and the settling tank do not have a fixed relation to each other. Thus, it is only possible to specify preferred dimensions and capacities which have been found to be satisfactory. It will be understood, however, that any relation which results in satisfactory operation is intended to be included within the scope of the invention. The same is true as regards the quantity of sealing liquid to be employed relative to the quantity of gas to be compressed and relative to the capacity of the system in which the sealing liquid is to be circulated. In an embodiment of the invention which has been found to give very satisfactory results a Nash type pump with a capacity of 2300 pounds of acetylene per hour at a suction pressure of 10 pounds per square foot and a discharge pressure of 25 pounds per square foot was employed. This pump discharged into a combined separator, settling tank, and sealing liquid cooler, with a capacity of about 90 cubic feet. A quantity of sealing liquid was employed which was sufficient to seal the pump, fill the system between the separator and pump (as represented by line 3 in the accompanying illustration) and fill the settling tank up to the overflow into line 11 which is located at about the 40 cu. ft. level, thus leaving a free space above the sealing liquid in the settling tank-separator-cooler of about 50 cu. ft.

The condensing system following line 13 is not a part of this invention, but the following description will assist in showing the relation of the novel apparatus to the condensing system used in the manufacture of acetylene polymers. The gas leaving 5 via 13 may be introduced into the drying system described by Chilton, U. S. 1,999,397, which may consist of one or several of the carbide-type dryers 14 in series or parallel. Preferably, several dryers should be so arranged in series that one or all may be used, the dryers being removed from service in sequence as they become hydrated and fresh ones introduced. The partially spent dryers should contact the relatively dry gas just before it leaves to enter the condensers. Such an arrangement permitting the use of one or more of the dryers in any desired series arrangement can be obtained by suitable manifolding. Gas leaving the carbide dryers may next pass through a preliminary cooler 15 and thence to the low temperature condenser 16 in which practically all of the acetylene polymer is condensed, together with part of the acetylene. The uncondensed gas which is essentially pure acetylene is separated from the liquid products in 17, leaves through line 18, is expanded back to the pressure of the reactor at valve 20, and is returned to the reactor. The control valve 20 may be automatically operated to maintain a constant pressure on the condensers and pump, thereby compensating for small variations in the pump pressure and maintaining a constant condensation temperature in 16. A large part of the available refrigeration in this cold gas may be recovered if it is used to cool the precooler 15, as shown, prior to its return to the catalyst through line 21. In view of the fact that notwithstanding the efforts to separate water completely, occasionally small amounts may pass the dryers and collect as frost or acetylene and vinylacetylene hydrates in 15 and 16, it is generally desirable to have 15 and 16 in duplicate as described in the previous Patent 2,048,838, so that they may be alternately used while the spare condensers are being defrosted. The need for this can be almost completely avoided if small amounts of alcohol are added to the gas stream entering 15, thus lowering the freezing point of the moisture sufficiently that it is carried through with the liquid products. The products separated in 17 from the recycled gas are drawn off through line 19 and subsequently stripped and purified in the manner described in previous and copending patents. When operating this compression cycle as well as when operating the previously suggested systems, particularly an absorption recovery process, it has proved advantageous to conduct the liquid from 19 to a preliminary stripping column where dissolved acetylene is distilled off. This volatilized acetylene may contain small amounts of vinylacetylene and instead of subjecting it to a careful fractionation process, it may be returned to the system at 1 instead of combining it with the gas in 21, thus recovering the entrained vinylacetylene together with the fresh vinylacetylene.

The materials of construction required for the pump, separator, lines and coolers in this novel brine cycle are dependent upon the nature of the gas entering at 1, but are obvious to one skilled in the art. If the gas entering at 1 is essentially neutral owing to the previous processing steps, the brine cycle may be constructed of steel, stainless steel or bronze. If bronze is used in contact with neutral acetylene, it should contain preferably less than 70% copper to prevent the formation of copper acetylide. If the gas entering at 1 is acid, or if acid is deliberately added to maintain a pH at which copper acetylide will not form, the brine cycle may be constructed of copper or bronze of any copper content which will resist the acid corrosion. Alloys which will withstand the acid corrosion and which are inert to acetylene may be used; alloys of iron, molybdenum and nickel, such as those known by the trade name of "Hastelloys" have been found particularly well suited for the purpose.

The circulating brine solution used in the pump cycle may be a saturated solution of sodium chloride, but many other solutions are satisfactory. With one exception, the circulating solution must be unreactive with all of the constituents of the mixture. The exception is the small aldehyde content of the gas mixture; it has been found satisfactory and even desirable to have a brine which will react with aldehydes, such as a sodium bisulfite brine, thus removing aldehyde and separating it with other products discharged at line 11. A wide variety of solutions suitable for the purpose of the so-called brine will be obvious to one skilled in the art, and their exact composition is not an essential part of this invention. Pure water might be used for the purpose, but it is less satisfactory than a salt solution for several reasons. First, it limits the degree of cooling which can be applied without freezing, and second, it has a higher water vapor pressure, therefore the gas leaving at 13 will be wetter than over a salt solution at the same temperature. Some water soluble organic liquids such as ethylene glycol and glycerol have been successfully used, but they are not as satisfactory as inorganic salts because they are more costly and because they have a greater solubility for the gaseous and liquid products. Obviously liquids having high solubility for the products of the reaction or acetylene are less desirable. Inorganic salts in aqueous solution are preferred, particularly sodium chloride and sodium bisulfite. Other satisfactory salts which may be used for the purpose include lithium chloride, potassium chloride, magnesium chloride, calcium chloride, zinc chloride and strontium chloride. The chlorides of magnesium, calcium and zinc show some slight tendency to cause polymerization of the condensed acetylene polymers, but this is slight and of no particular consequence. The solutions should be neutral or acid; alkaline solutions, if proper materials of construction are used are not prohibited, but are likely to result in emulsification of the condensed acetylene polymers, making the subsequent separation difficult.

As previously stated, the purpose of the brine is to seal the pump, serve as a cooling medium, and accumulate condensed moisture. Thus the brine must be a water soluble liquid, preferably with a low freezing point, practically immiscible with nonbenzenoid acetylene polymers, and preferably with a relatively low water partial pressure. Experience, for example, has shown that the moisture content of the gas leaving a saturated NaCl brine at 0° C. contains more than 20% less water than when the pump cycle is sealed with water at the same temperature. Obviously, also, the concentration of the dissolved salt may be anything in the range between 0% and saturation at the lowest temperature in the brine cycle. The preferred concentration is generally the more saturated range, thus about 20 to 23% in the case of sodium chloride. The concentration of the brine and its water content can be controlled conveniently as a rule by its density.

It has been stated above that according to the preferred procedure a temperature of about 0° C. is maintained in the compressor. Of course, this temperature may be varied somewhat in either direction within the scope of this invention. The nature of the sealing liquid itself determines the lower limit of operating temperature since the sealing liquid cannot be cooled below its freezing point. The operating range runs from the minimum (the temperature which can be maintained by cooling the sealing liquid to a temperature just above that at which its commences to freeze) up to about room temperature but the preferred operating temperatures are found near the minimum for reasons which are apparent from the above description. Where the sealing liquid is a saturated solution of sodium chloride a preferred operating temperature to be maintained in the pump is from about −15° C. to about +5° C.

In addition to cooling and condensing moisture, the pump cycle serves to circulate the gas from the reactor through the condensing cycle and thence, back to the reactor. Further, it serves to compress the gas to assist in the condensation cycle. One or more liquid sealed pumps can be used to obtain any pressure desired, and obviously, the higher the pressure applied, the higher the refrigeration temperature may be in condenser 16 to obtain practically complete removal of vinylacetylene. For the sake of economy, it is desirable to obtain condensation with minimum refrigeration (maximum condensation temperature), but this is limited by safety. The extent to which the gas mixture can be compressed safely is not exactly known, but experience in handling acetylene mixtures of this type would indicate that absolute pressures exceeding 50 to 65 lbs. per square inch are probably dangerous in the absence of an inert gaseous diluent. In general, operation at a pressure range of about 15 to about 30 lbs. per square inch gauge is preferred. The influence of pressure on the condensation temperatures of acetylene, vinylacetylene, divinylacetylene etc., are well known, and from this data, the temperatures in 16 can be calculated to obtain any desired stripping of vinylacetylene from the recirculated acetylene.

The objects of this invention are accomplished thru the use of a liquid sealed rotary pump and particularly thru the design, arrangement and operation of the brine cycle comprising pump, separator, settling vessel, and brine cooler. Through this particular arrangement and operation of equipment, a novel process has been contributed for compressing mixtures of acetylene and acetylene polymers, further, a process has been disclosed for compressing and simultaneously cooling mixtures of this type, and still further these features are accomplished with simultaneous condensation and disposal of liquid constituents, particularly water.

It will be apparent that many widely different embodiments of this invention may be made without departing from the spirit and scope thereof and, therefore, it is not intended to be limited except as indicated in the appended claims.

I claim:

1. Process for treating gases from non-benzenoid polymerization of acetylene in the presence of an aqueous polymerization catalyst, which gases comprise acetylene, monovinylacetylene, higher acetylene polymers, aldehyde and water, which process comprises compressing and cooling said reaction gases by passing them through a liquid sealed rotary pump together with a water-soluble bisulfite containing sealing liquid which is practically immiscible with non-benzenoid acetylene polymers and which sealing liquid is at a lower temperature than the reaction gases, whereby the water vapor of the reaction gases is liquefied and is dissolved in the sealing liquid, the said higher acetylene polymers are at least partially condensed and the aldehyde is removed from the gases, separating the remaining gases, the condensed acetylene polymers, and the sealing liquid, and recirculating the sealing liquid.

2. Process for treating gases from non-benzenoid polymerization of acetylene in the presence of an aqueous polymerization catalyst, which gases comprise acetylene, monovinylacetylene, higher acetylene polymers, aldehyde and water, which process comprises compressing and cooling said reaction gases by passing them through a liquid sealed rotary pump together with an aqueous brine containing sodium bisulfite as a sealing liquid, which sealing liquid is at a lower temperature than the reaction gases, whereby the water vapor of the reaction gases is liquefied and is dissolved in the sealing liquid, the said higher acetylene polymers are at least partially condensed and the aldehyde is removed from the gases, separating the remaining gases, the condensed acetylene polymers and the sealing liquid, and recirculating the sealing liquid.

ALBERT S. CARTER.